United States Patent [19]

Schwartz

[11] 4,419,481

[45] Dec. 6, 1983

[54] SMALL PARTICLE SIZE LATEX USEFUL AS A PRESSURE SENSITIVE ADHESIVE

[75] Inventor: James E. Schwartz, Midland, Mich.

[73] Assignee: The Dow Chemical Company, Midland, Mich.

[21] Appl. No.: 438,183

[22] Filed: Nov. 1, 1982

Related U.S. Application Data

[63] Continuation-in-part of Ser. No. 251,008, Apr. 3, 1981.

[51] Int. Cl.$^3$ .............................................. C08L 47/00
[52] U.S. Cl. ................................... 524/551; 524/552; 524/556; 524/560; 524/561; 524/567; 524/568; 524/571; 524/575; 524/577; 524/822; 524/825; 524/832; 524/834; 524/272; 524/273; 428/521
[58] Field of Search ............... 524/551, 552, 556, 560, 524/561, 567, 568, 571, 575, 577, 272, 273

[56] References Cited

U.S. PATENT DOCUMENTS

| | | | |
|---|---|---|---|
| 3,432,455 | 3/1969 | Rasicci | 524/745 |
| 3,574,159 | 4/1971 | Fetter et al. | 524/748 |
| 3,756,974 | 9/1973 | Buchheim et al. | 524/458 |
| 3,759,859 | 9/1973 | Steinwand | 524/248 |
| 3,793,244 | 2/1974 | Mcgee et al. | 362/396 |
| 3,869,418 | 3/1975 | Peterson et al. | 524/460 |
| 3,966,661 | 6/1976 | Feast et al. | 524/745 |
| 3,970,629 | 7/1976 | Izaki et al. | 524/26 |
| 4,001,163 | 1/1977 | Matner et al. | 524/745 |
| 4,069,188 | 1/1978 | Canard et al. | 524/556 |
| 4,130,691 | 12/1978 | Canard et al. | 428/511 |

Primary Examiner—Joseph L. Schofer
Assistant Examiner—Bernard Lipman
Attorney, Agent, or Firm—Jeffrey S. Boone

[57] ABSTRACT

A pressure-sensitive adhesive is prepared by blending (1) a small particle size latex having a hard monomer (such as styrene), a soft monomer (such as butadiene) and, optionally, an acid (such as itaconic acid), and (2) a tackifying resin. These adhesives have an excellent combination of properties including peel adhesion and shear adhesion.

15 Claims, No Drawings

SMALL PARTICLE SIZE LATEX USEFUL AS A PRESSURE SENSITIVE ADHESIVE

CROSS-REFERENCE TO RELATED APPLICATIONS

This application is a continuation-in-part of Application Ser. No. 251,008, filed Apr. 3, 1981.

BACKGROUND OF THE INVENTION

The instant invention relates to latexes useful in sealing and adhesive applications, and particularly to latexes useful as pressure sensitive adhesives.

Pressure sensitive adhesives (PSAs) are adhesive materials which, when dried, possess a lasting aggressive tack which enables them to tenaciously adhere to a wide variety of substrates when applied with only light pressure. These adhesives are useful in a variety of applications including tapes, labels, wall coverings, floor tiles, wood veneers and hobby adhesives.

PSAs have traditionally been manufactured in solvent based systems. Recently, however, concerns over the cost of solvents, the flammability of solvents, regulations on solvent emissions and the energy required to keep the work place atmosphere solvent free, have made nonsolvent systems very desirable. While a few attempts have been made to produce a water based PSA, such attempts have generally failed to produce an acceptable material. Specifically, most attempts are able to produce an adhesive having either good peel adhesion or good shear adhesion, but not an adhesive having both properties.

SUMMARY OF THE INVENTION

Briefly, the invention is a pressure sensitive adhesive comprising a latex having a soft monomer and a hard monomer, and a number average particle size of less than about 120 nanometers (nm), and a tackifying amount of a tackifying resin. The invention is also an article carrying a dried coating of the adhesive of the invention. The adhesive of the invention exhibits a combination of both good peel adhesion and good shear adhesion.

DETAILED DESCRIPTION OF THE INVENTION

The latexes used in the instant invention employ, as major ingredients, a soft monomer and a hard monomer. These latexes also optionally employ, as a minor ingredient, an ethylenically unsaturated carboxylic acid. The proportion of the monomers is desirably adjusted such that the resulting latex has an optimum combination of peel adhesion and shear adhesion. Specifically, the soft monomer is added in an amount such that the latex has soft, sticky and rubbery properties; and the hard monomer is added in an amount such that the latex has hard, plastic and strength properties. The acid is added in an amount such that the latex has colloidal stability and processability. Generally, the latexes are prepared from (a) desirably about 30 to about 90, preferably about 40 to about 80, and most preferably about 50 to about 70, parts by weight of a soft monomer; (b) desirably about 10 to about 70, preferably about 20 to about 60, and most preferably about 30 to about 50, parts by weight of a hard monomer; and (c) desirably about 0.5 to about 10, preferably about 1 to about 5, and most preferably about 1 to about 4, parts by weight of an ethylenically unsaturated carboxylic acid.

It is also necessary to control the molar mass (molecular weight) of the latex polymers. This is most easily accomplished by including in the synthesis of the latex, a chain transfer agent. The molar mass of the polymers is desirably such that the polymer particles show an optimum combination of peel adhesion and shear adhesion. If a chain transfer agent is used to control molar mass, it is desirable that the chain transfer agent have a chain transfer constant similar to that of n-octyl mercaptan or t-dodecyl mercaptan. Such a chain transfer agent is is desirably present in quantities of about 0.5 to about 5, preferably about 1 to about 5 and most preferably about 2 to about 4, weight percent, based on the total monomer weight. While less efficient chain transfer agents may be used, the quantity added will have to be adjusted in accordance with its chain transfer constant. Such calculations are easily made by those skilled in the art.

The term "soft monomer" is meant to include those addition polymerizable monomers which, if homopolymerized, would have a relatively low glass transition temperature ($T_g$). The $T_g$ for this class of monomers is desirably less than about 25° C.

Desirably, the term "soft monomer" is meant to include soft esters of unsaturated acids with saturated alcohols. The term "soft esters of unsaturated acids with saturated alcohols" is meant to include, typically, soft acrylates (i.e., those whose homopolymers have a $T_g$ of less than about 25° C.) such as benzyl acrylate, butyl acrylate, n-butyl acrylate, cyclohexyl acrylate, dodecyl acrylate, ethyl acrylate, 2-ethylbutyl acrylate, 2-ethylhexyl acrylate, heptyl acrylate, hexyl acrylate, isobutyl acrylate, isopropyl acrylate, methyl acrylate, propyl acrylate, etc.; and soft methacrylates such as butyl methacrylate, and hexyl methacrylate. The cost, availability and known properties of butyl acrylate and ethyl acrylate make these monomers preferred among the soft esters of unsaturated acids with saturated alcohols.

More desirably, the term "soft monomer" is meant to include a class of monomers which are open chain aliphatic conjugated diene monomers having a $T_g$ of less than about 25° C. The term "open chain aliphatic conjugated diene" is meant to include, typically, those compounds containing from 4 to about 9 carbon atoms such as, for example, 1,3-butadiene; 2-methyl-1,3-butadiene; 2,3-dimethyl-1,3-butadiene; pentadiene; 2-neopentyl-1,3-butadiene and other hydrocarbon analogs of 1,3-butadiene and, in addition, the substituted 1,3-butadienes, such as 2-chloro-1,3-butadiene; 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymer having particularly desirable properties and are therefore preferred. The cost, ready availability and the excellent properties of interpolymers produced therefrom makes 1,3-butadiene the most preferred open chain aliphatic conjugated diene.

The term "hard monomer" is meant to include those addition polymerizable monomers which are not carboxylic acids, and if homopolymerized, would have a relatively high $T_g$. The $T_g$ for this class of compounds is desirably greater than about 25° C.

Desirably the term "hard monomer" is meant to include the hard esters of unsaturated acids with saturated alcohols. The term "hard esters" of unsaturated acids with saturated alcohols is meant to include, typically, hard acrylates (i.e., those whose homopolymers have a $T_g$ of greater than about 25° C.) such as 4-biphenylyl acrylate and tert-butyl acrylate; and hard methacrylates such as sec-butyl methacrylate, tertbutyl methacrylate, cyclohexyl methacrylate, ethyl methacrylate, isobutyl methacrylate, isopropyl methacrylate, methyl methacrylate, propyl methacrylate, etc. The cost, availability and known properties of methyl methacrylate make it preferred among the hard esters of unsaturated acids with saturated alcohols.

More desirably, the term "hard monomer" is meant to include a class of monomers which are monovinylidene aromatic monomers having a $T_g$ of greater than about 25° C. The term "monovinylidene aromatic monomer" is intended to include those monomers wherein a radical of the formula:

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho, meta- and para-methylstyrene; ortho-, meta- and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinylidene aromatic monomer.

The aforementioned ethylenically unsaturated carboxylic acid monomers which are optionally, but preferably, employed in the practice of the invention can vary so long as such acids are copolymerizable with the other monomers of the monomer charge employed. Examples of such suitable acids include itaconic acid, acrylic acid, methacrylic acid, fumaric acid, maleic acid, vinyl benzoic acid and isopropenyl benzoic acid and preferred species thereof include acrylic acid, methacrylic acid, itaconic acid, fumaric acid and maleic acid. Naturally, comonomeric mixtures of the indicated monoethylenically unsaturated acids can be employed if desired. Moreover, such acids can be introduced to the polymerization as such as they can be formed in situ in an aqueous polymerization medium by introducing a hydrolyzable derivative of such acid (e.g., salts (such as sodium acrylate) or the anhydride (such as maleic anhydride) of the desired acid) into such aqueous medium.

Of course, other hard monomers, soft monomers, and carboxylic acids may be used in addition to or as a replacement for the preferred species specifically enumerated above. For instance, the latexes of the invention may contain substantial amounts of vinylidene chloride or vinyl chloride. Further, monomers not usually suitable for latexes may be used in minor amounts. For example, in some applications it may be desired to include a small amount (e.g., 0.5 weight percent) of a water-soluble monomer such as acrylamide.

The latexes may be polymerized by any of several methods well-known to those skilled in the art. Such methods include the use of a batch reaction, continuous reaction, or continuous addition batch reaction, the latter being preferred. While not critical, the latex is preferably synthesized to an end product having about 40 to about 60 percent solids.

The particle size of the latex is very important for an optimum combination of adhesion and shear strength. The number average particle size (diameter) of the latex particles is desirably less than about 120 nm, preferably less than about 110 nm, and most preferably less than about 100 nm, as measured by hydrodynamic chromatography (HDC), calibrated with electron microscopy. As particle size increases, peel adhesion will increase slightly, but shear adhesion will decrease dramatically.

It has been observed that when very small particles (76 nm and less, as measured by HDC calibrated with electron microscopy) are made, end performance of the adhesive formulations is somewhat reduced. This is believed to be the result of increased cross-linking in smaller particles and/or a core-shell structure effect, both of which may be overcome through adjustments in the polymerization conditions.

Particle size of the latexes may be controlled by a variety of techniques including careful measurement and use of surfactant, and the use of a seed latex. These methods are well-known to those skilled in the art. Particle size control of emulsion polymerized particles is explained, for example, in Meyers & Long, *Treatise on Coatings and Film Forming Compositions*, Volume I, Part 2 (1968) (See: Chapter by F. A. Miller); Elias, *Macromolecules*, Volume 2 (1977) pp. 733–736; Blachley, *Emulsion Polymerization*, (1975) Chapter 7.

After the latex is prepared, it is desirably steam distilled to remove unreacted monomer and then treated with a suitable base, desirably $NH_4OH$, to a pH of about 7 to about 11, preferably about 8 to about 10.

To render the latex useful as a PSA, it is blended with a tackifier. Tackifiers increase the tackiness of adhesives. In many cases they also increase the affinity of adhesives for specific surfaces such as plastics or metals. Tackifiers are generally organic resins and are preferably in the form of an aqueous dispersion. Typical examples of tackifiers include polyterpene resins, gum rosin, rosin esters and other rosin derivatives, oil-soluble phenolic resins, coumarone-indene resins, and petroleum hydrocarbon resins. Tackifiers are desirably added in an amount such that the latex is given additional tack (quick stick and peel adhesion) without detracting unduly from shear adhesion. Suitable formulations will typically have about 1 to about 90 percent, preferably about 20 to about 60 percent, and most preferably about 30 to about 50 percent by weight, tackifier.

Optionally, certain other ingredients may be added to the PSA latex of the invention. Plasticizers such as mineral oil, liquid polybutenes, liquid polyacrylates, and lanolin may be added. Fillers such as zinc oxide, titanium dioxide, aluminum hydrate, calcium carbonate, clay, and pigments are commonly employed. Antioxidants such as rubber antioxidants, metal dithiocarbamates, and metal chelating agents may be useful in some applications.

The PSA formulated latex/tackifier is illustratively used by applying it to a substrate and drying. The formulation may be applied by a variety of well-known means including drawing, spraying, and brushing. Drying may take place at room temperature for an extended period of time (for example, 2 to 24 hours, depending upon application rate and relative humidity) or at an elevated temperature for a shoft period of time (for example, 25° F. (121° C.) for two minutes).

After drying, the formulation is usuable as a PSA. If not intended to be used immediately, the exposed surface may be protected with a paper having a suitable release coating. In many applications, it is more convenient to apply the adhesion to the release coating, and then join the substrate to the adhesive.

Further aspects of the invention will become apparent from the following examples. In the examples, all parts are by weight. Units in brackets, are SI units (Newtons [N]) calculated from original measurements in English (U.S.) units. Peel adhesion and quick stick are evaluated on stainless steel with a Scott X-5 tester (available from Henry L. Scott Co.) at a rate of 10 inches/minute (254 mm/minute) according to Pressure Sensitive Tape Counsel (PSTC) procedures #1 and #5, respectively. The peel adhesion test involves peeling the tape off at a 180° angle after application under relatively heavy pressure. The quick stick test involves peeling the tape off at a 90° angle after application under relatively light pressure. Both tests are reported as the force required to remove the tape. Shear adhesion is measured according to PSTC #7 using a 1000 g mass and 120° F. (48.9° C.). In this test, a shear force (2° angle) is applied in an oven. The results are reported as the time required for the bond to fail.

COMPARATIVE EXAMPLE 1: S/B LATEX

Part A:

A latex is prepared according to the formula in Table I.

TABLE I

|  | Parts/100 Parts Monomer |
|---|---|
| INITIAL REACTOR MIX |  |
| Condensate Water | 71.2 |
| VERSENEX ® 80 chelating agent (1.0%)[1] | 0.01 |
| Itaconic Acid | 2.0 |
| Seed (36.5% solids, 27 nm diameter particle size) | 0.36 |
| MONOMER MIX |  |
| Styrene | 48 |
| Isooctyl thioglycolate (IOTG) | 3 |
| Butadiene | 50 |
| AQUEOUS MIX |  |
| DI Water | 30 |
| $NaH_2S_2O_8$ | 0.7 |
| NaOH (10%) | 0.14 |
| DOWFAX ® 2A1 surfactant (45%)[2] | 0.5 |

[1]Available from the Dow Chemical Company, Midland, MI, U.S.A. A 1 percent solution of the pentasodium salt of (carboxymethyl-imino)bis-(ethylenenitrilo)tetraacetic acid.
[2]Available from The Dow Chemical Company, Midland, MI, U.S.A. A 45 percent solution of the sodium salt of dodecylated sulfonated phenyl ether.
® Trademark of The Dow Chemical Company The monomer mix and aqueous mix are added to the initial reactor mix over a period of time. The additions are begun simultaneously; with the addition of the monomer mix taking 5 hours and the addition of the aqueous mix taking 6 hours. The reaction vessel is maintained at 90° C. during the additions and for 1 hour thereafter. The latex is then steam distilled to remove unreacted monomer and neutralized with $NH_4OH$ to a pH of 7–8.

Part B:

60 parts by weight (solids basis) of the latex are blended with 40 parts by weight (solids basis) of Piconal A600E, an aqueous dispersion of an organic resin tackifier. The blend is applied to a commercial paper tape backing with a No. 50 wire wound rod at 25 lbs/3000 ft.$^2$ (0.41 kg/m$^2$), dried for 2 minutes at 250° F. (121° C.) and cut into 1 inch (25.4 mm) wide strips for testing.

EXAMPLE 1

A latex is made following the procedure in Part A of Comparative Example 1. Two other latexes are made, Sample 1—1 having more seed latex (for smaller particle size) and Sample 1-2 having less seed latex (for larger particle size) than the latex of Comparative Example 1. All samples are tackified and coated on tape backing as in Part B of Comparative Example 1 and evaluated. The results appear as in Table II.

TABLE II

| Latex Sample No. | 1-1[1] | 1-2 | Comparative Example 1[1] |
|---|---|---|---|
| Variables: |  |  |  |
| Parts Seed | 0.15 | 5.0 | 0.36 |
| Process: |  |  |  |
| % Solids | 42.8 | 39.5 | —[4] |
| Particle Size (nm) | 220[2] | 92.0[3] | 180[2] |
| % Residual Styrene | 2.7 | 0.3 | —[4] |
| End-Use: |  |  |  |
| Peel Adhesion (oz) | 45 | 40 | 63 |
| [N] | [12.5] | [11.1] | [17.5] |
| Shear Adhesion (min) | 22 | >200 | 19 |

[1]Not an example of the invention.
[2]Measured by Brice-Phoenix.
[3]Measured by hydrodynamic chromatography (HDC).
[4]Not measured.

EXAMPLE 2

A latex is made as in Part A of Comparative Example 1. Several more similar latexes are made, each having the particle size varied. The samples are tackified and coated onto tape backing as in part B of Comparative Example 1. The results as in Table III.

TABLE III

| Latex Sample | 2-1 | 2-2 | 2-3 | 2-4 | Comparative Example 1[1] |
|---|---|---|---|---|---|
| Variables: |  |  |  |  |  |
| Seed (parts) | 10.0 | 4.0 | 3.0 | 2.0 | 0.36 |
| Styrene (parts) | 48 | 48 | 48 | 48 | 48 |
| Butadiene (parts) | 50 | 50 | 50 | 50 | 50 |
| IOTG (parts) | 3 | 3 | 3 | 3 | 3 |
| Process: |  |  |  |  |  |
| % Solids | 39.3 | 39.0 | 39.4 | 39.0 | —[2] |
| Particle Size (nm) (HDC) | 75.6 | 95.0 | 102 | 116 | —[2] |
| Particle Size (nm) (Brice-Phoenix) | 119[3] | 105 | 110 | 119 | 180 |
| % Residual Styrene | 0.3 | 0.5 | 0.4 | 0.6 | —[2] |
| End-Use: |  |  |  |  |  |
| Peel Adhesion (oz) | 17 | 48 | 89 | 108 | 68 |
| [N] | [4.73] | [13.3] | [24.7] | [30.0] | [18.9] |
| Quick Stick (oz) | —[2] | —[2] | 10 | 16 | 23 |
| [N] |  |  | [2.78] | [4.45] | [6.39] |
| Shear | 51 | >200 | >200 | 37 | 25 |

TABLE III-continued

| Latex Sample | 2-1 | 2-2 | 2-3 | 2-4 | Comparative Example 1[(1)] |
|---|---|---|---|---|---|
| Adhesion (min) | | | | | |

[(1)]Not an example of the invention.
[(2)]Not measured.
[(3)]This measurement is believed to be too large due to inaccuracies in the Brice-Phoenix light scattering technique when very small particle sizes are measured. The HDC measurement is believed to be both more accurate and more precise.

EXAMPLE 3

Generally following the procedures of Example 1, several more latexes are prepared, each having a particle size of less than about 120 nm. The latex recipes are shown in Table IV. These latexes are blended with a tackifying resin and are applied to a substrate and dried. The adhesive articles so prepared exhibit excellent peel adhesion and shear adhesion.

TABLE IV

| | Monomer[(1)] | | | | |
|---|---|---|---|---|---|
| Sample | Styrene | 1,3-Butadiene | N—butyl Acrylate | Itaconic Acid | Acrylic Acid |
| 4-1 | 27 | — | 70 | — | 2 |
| 4-2 | 23 | — | 75 | 2 | — |
| 4-3 | 38 | 40 | 20 | 2 | — |

[(1)]Weight percent, based on the total weight of the monomer charge.

What is claimed is:

1. A pressure-sensitive adhesive formulation comprising a blend of
   (a) an aqueous synthetic polymer latex comprising disperse polymer particles having a number average diameter of less than about 120 nm, as measured by hydrodynamic chromatography calibrated by electron microscopy, and which individually comprise:
      (i) a soft monomer, a homopolymer of which would have a glass transition temperature of less than about 25° C., in an amount to impart stickiness to the latex,
      (ii) a hard monomer, a homopolymer of which would have a glass transition temperature of greater than about 25° C., in an amount to impart strength to the latex; and
   (b) a tackifying amount of a tackifying resin.

2. The adhesive of claim 1 wherein the latex particles additionally comprise an ethylenically unsaturated carboxylic acid monomer.

3. The pressure-sensitive adhesive formulation of claim 2 wherein the latex particles individually comprise per 100 parts by weight of the polymer particle:
   (a) from about 30 to about 90 parts of a soft monomer;
   (b) from about 10 to about 70 parts of hard monomer; and
   (c) from about 0.05 to about 10 parts of an ethylenically unsaturated carboxylic acid monomer.

4. The pressure-sensitive adhesive formulation of claim 2 wherein the soft monomer is an open chain conjugated diene.

5. The pressure-sensitive adhesive formulation of claim 2 wherein the hard monomer is a monovinylidene aromatic.

6. The pressure-sensitive formulation of claim 2 wherein the soft monomer is an open chain conjugated diene and the hard monomer is a monovinylidene aromatic.

7. The pressure-sensitive adhesive formulation of claim 6 wherein the open chain conjugated diene is butadiene and the monovinylidene aromatic is styrene.

8. The pressure-sensitive adhesive formulation of claim 2 wherein the number average particle size is less than about 110 nm.

9. The pressure-sensitive adhesive formulation of claim 2 wherein the number average particle size is between about 120 and about 76 nm.

10. The pressure-sensitive adhesive formulation of claim 2 wherein the latex is present at from about 10 to about 99 weight parts on a solids basis and the tackifying resin is present at from about 1 to about 90 weight parts on a solids basis.

11. A pressure-sensitive adhesive article comprising a substrate coated with the adhesive formulation of claim 1.

12. A pressure-sensitive adhesive article comprising a substrate coated with the adhesive formulation of claim 3.

13. A pressure-sensitive adhesive article comprising a substrate coated with the adhesive formulation of claim 7.

14. A pressure-sensitive adhesive article comprising a substrate coated with the adhesive formulation of claim 9.

15. A pressure-sensitive adhesive article comprising a substrate coated with the adhesive formulation of claim 10.

* * * * *

UNITED STATES PATENT AND TRADEMARK OFFICE
CERTIFICATE OF CORRECTION

PATENT NO. : 4,419,481
DATED : December 06, 1983
INVENTOR(S) : James E. Schwartz It is certified that error appears in the above—identified patent and that said Letters Patent is hereby corrected as shown below:

Column 2, line 13, delete "is" first instance;

Column 2, line 58, "interpolymer" should read -- interpolymers --.

Column 3, line 56, "as" (2nd Occurr.) should read -- or --.

Column 5, line 5, "shoft" should read -- short --;

Column 5, line 6, "25°" should read -- 250° --;

Column 5, line 7, "usuable" should read -- usable --;

Column 5, line 11, "adhesion" should read -- adhesive --;

Column 5, line 55, "the" should read -- The --.

Column 6, line 45, "results as in" should read -- results appear as in --.

Signed and Sealed this

Twentieth Day of November 1984

[SEAL]

Attest:

GERALD J. MOSSINGHOFF

Attesting Officer    Commissioner of Patents and Trademarks